United States Patent
Rimhagen et al.

(10) Patent No.: US 11,516,682 B2
(45) Date of Patent: Nov. 29, 2022

(54) METHODS AND NODES FOR OBTAINING INFORMATION REGARDING A BLUETOOTH MESH NETWORK

(71) Applicant: Telefonaktiebolaget LM Ericsson (publ), Stockholm (SE)

(72) Inventors: Thomas Rimhagen, Linköping (SE); Jingcheng Zhang, Svärtinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 57 days.

(21) Appl. No.: 16/961,712

(22) PCT Filed: Mar. 16, 2018

(86) PCT No.: PCT/SE2018/050259
§ 371 (c)(1),
(2) Date: Jul. 13, 2020

(87) PCT Pub. No.: WO2019/177505
PCT Pub. Date: Sep. 19, 2019

(65) Prior Publication Data
US 2021/0211905 A1 Jul. 8, 2021

(51) Int. Cl.
*H04W 24/06* (2009.01)
*H04W 84/18* (2009.01)

(52) U.S. Cl.
CPC ............ *H04W 24/06* (2013.01); *H04W 84/18* (2013.01)

(58) Field of Classification Search
CPC ...... H04W 24/08; H04W 24/06; H04W 84/18
See application file for complete search history.

(56) References Cited

U.S. PATENT DOCUMENTS

| 9,198,203 | B2 | 11/2015 | Shaffer et al. | |
|---|---|---|---|---|
| 2007/0070911 | A1* | 3/2007 | Goldberg | H04W 24/06 370/248 |
| 2015/0244623 | A1 | 8/2015 | Heydon et al. | |

(Continued)

FOREIGN PATENT DOCUMENTS

| CN | 107148038 A | 9/2017 |
|---|---|---|
| EP | 1594278 A1 | 11/2005 |

(Continued)

OTHER PUBLICATIONS

PCT International Search Report and Written Opinion dated Jan. 21, 2019 for International Application PCT/SE2018/050259, 8 pages.

(Continued)

*Primary Examiner* — Syed Ali
(74) *Attorney, Agent, or Firm* — Sage Patent Group

(57) ABSTRACT

Embodiments support obtaining of information regarding a Bluetooth mesh network (100) operating according to a set of rules, e.g. flooding or routing, for propagating messages in the network (100). It is transmitted (204), from said test originator node (101) in accordance with said set of rules, a sequence of test messages towards said test target node (105). Each of said test messages includes: parameters comprising a test message identifier being an identifier of the test message in the sequence, and a type identifier identifying the test message as a certain type associated with said parameters.

20 Claims, 9 Drawing Sheets

(56) References Cited

U.S. PATENT DOCUMENTS

| | | | |
|---|---|---|---|
| 2015/0245182 A1* | 8/2015 | Scagnol | G06F 21/44 |
| | | | 370/312 |
| 2016/0366642 A1* | 12/2016 | Singh | H04W 56/001 |
| 2017/0070841 A1* | 3/2017 | Shalunov | H04W 4/80 |
| 2017/0111266 A1 | 4/2017 | Ko | |
| 2017/0134227 A1 | 5/2017 | Song et al. | |
| 2017/0156102 A1* | 6/2017 | Singh | H04W 40/246 |
| 2018/0160301 A1* | 6/2018 | Kwon | H04W 4/06 |
| 2018/0176851 A1* | 6/2018 | Lim | H04W 40/12 |
| 2019/0033910 A1* | 1/2019 | Eder | G06F 13/40 |
| 2019/0045515 A1* | 2/2019 | Kwasnick | H04W 12/12 |
| 2019/0073895 A1* | 3/2019 | Pang | G08B 25/009 |
| 2019/0200193 A1* | 6/2019 | Bae | H04W 8/005 |
| 2020/0257495 A1* | 8/2020 | Chen | G08C 17/02 |

FOREIGN PATENT DOCUMENTS

| | | |
|---|---|---|
| WO | 2016178612 A1 | 11/2016 |
| WO | 2017007409 A1 | 1/2017 |
| WO | 2017160223 A1 | 9/2017 |

OTHER PUBLICATIONS

Mesh Working Group, "Mesh Profile", Bluetooth Specification, v1.0, Jul. 13, 2017, 331 pages.
Extended European Search Report dated Nov. 9, 2021 for European Patent Application No. 18910065.4, 9 pages.

\* cited by examiner

| TO | TT | SEQ |
|---|---|---|
| N1 | N5 | 1, 2, 5, 6, 7, 8, 9, 10, 11, 13, 14, 15 |
| N5 | N1 | 2, 3, 4, 5, 6, 7, 8, 9, 10, 12, 13, 14, 15 |

FIG 4a

| to / from | N1 | N2 | N3 | N4 | N5 | N6 | N7 |
|---|---|---|---|---|---|---|---|
| N1 |  | 96 | 98 |  |  | 90 |  |
| N2 | 92 |  |  | 66 | 82 |  |  |
| N3 | 98 |  |  | 91 |  |  |  |
| N4 |  | 75 | 90 |  | 97 |  |  |
| N5 |  | 87 |  | 95 |  |  | 86 |
| N6 | 84 |  |  |  |  |  |  |
| N7 |  |  |  |  | 85 |  |  |

FIG 4b

METHODS AND NODES FOR OBTAINING INFORMATION REGARDING A BLUETOOTH MESH NETWORK

CROSS-REFERENCE TO RELATED APPLICATIONS

This application is a 35 U.S.C. § 371 national stage application for International Application No. PCT/SE2018/050259, entitled "METHODS AND NODES FOR OBTAINING INFORMATION REGARDING A BLUETOOTH MESH NETWORK", filed on Mar. 16, 2018, the disclosures and contents of which are hereby incorporated by reference in their entireties.

TECHNICAL FIELD

Embodiments herein relate to method and nodes for obtaining information about a Bluetooth mesh network, such as information relating to topology of the network, how network nodes of the network are interconnected, status regarding the network nodes, how messages propagate in the network and possible problems related to that, network diagnostic, etc.

BACKGROUND

Bluetooth is a wireless communication technology for exchanging data over short distance. Bluetooth Low Energy (BLE) is a wireless network technology designed by the Bluetooth Special Interest Group (SIG) aimed at e.g. applications in the healthcare, fitness, security, and home automation industries. Compared to so called Classic Bluetooth, BLE is intended to provide considerably reduced power consumption and cost while maintaining a similar communication range. On the other hand, the amount of data being transmitted by BLE devices is less than Classic Bluetooth devices. BLE is e.g. described in Bluetooth Core Specification 4.2 and is also marketed under the mark Bluetooth Smart. BLE is a wireless technology that may be used in so called Personal Area Networks (PAN).

The Bluetooth SIG has further, in a specification named "Mesh Profile", v. 1.0, defined fundamental requirements to enable an interoperable mesh networking solution for BLE.

In a mesh network there are nodes, typically devices, e.g. sensors and actuators, and relay devices, which have the capability to forward received messages, i.e. retransmit received messages. "Messages" are typically used in the context of Bluetooth mesh networks instead of "packets". One way to retransmit is simply that a device that receives a message will forward the message to all its neighboring nodes. Restrictions on the number of such transmissions can be applied so that loops with infinite re-transmissions can be avoided. This technique is known as flooding and requires no information on particular routes among nodes that a message shall take and is resistant to changes in the topology. Also, flooding fits well with the characteristics of devices in low power networks, which are usually constrained in terms of memory and computational resources. A more complex way of delivering packets through networks is through the technique known as routing. Advantages involve that resources are used more efficiently, e.g. channels, increase of network capacity etc. Routing typically involves unicast or multicast transmissions between devices along a route from a source to one or more destinations. Therefore, in a routing network, the nodes have to find a route towards a given destination. One of the advantages of a routing network is that packets are sent on one route from the source to the destination and only devices on that route are involved in forwarding the packet. This typically means that interference is reduced, and increased network throughput is enabled.

Flooding is currently supported by said "Mesh Profile" specification and routing is currently considered for future revisions. Routing for Bluetooth mesh networks have e.g. been discussed in WO 2017/007409 A1 and WO 2017/160223 A1.

Both in the case of flooding and routing it is realized there is a set of rules that determines how messages are propagated, such as forwarded, in the network.

A mesh network, such as specified in said "Mesh Profile" specification, contains different types of nodes, such as low power nodes, friend nodes, relays, and gateways.

When a commercial Bluetooth Mesh network is deployed, it is important that the network performance can be assured in a way that the running applications can trust that is will work sufficiently well, preferably all the time. However, the performance of a mesh network depends on many factors, such as the number of nodes, the type of nodes, the deployment, the transmit output power, background interference, network traffic load, propagation properties, such as indoor and/or outdoor and/or frequency bands and/or attenuation factors network configuration, etc.

Further, any Bluetooth mesh network of today can be seen as a black-box for applications running on top of it. The applications sometimes can detect lost messages and adapt the number of retransmission, but if it does not work well, there is no clue on what is going wrong inside the mesh network.

SUMMARY

In view of the above, an object is to provide one or more improvements regarding Bluetooth mesh networks, particularly regarding assessment of Bluetooth mesh networks and performance thereof.

According to a first aspect of embodiments herein, the object is achieved by a method for supporting obtaining of information regarding a Bluetooth mesh network operating according to a set of rules for propagating messages in the network. It is determined a node of said network to be a test originator node and at least one other node of said network to be a test target node. Further, it is transmitted, from said test originator node in accordance with said set of rules, a sequence of test messages towards said test target node. Each of said test messages includes: parameters comprising a test message identifier being an identifier of the test message in the sequence, and a type identifier identifying the test message as a certain type associated with said parameters.

According to a second aspect of embodiments herein, the object is achieved by a method, performed by a first node, for supporting obtaining of information regarding a Bluetooth mesh network operating according to a set of rules for propagating messages in the network. Said first node being comprised in said network and operative as a test originator node. The first node transmits, in accordance with said set of rules, a sequence of test messages towards a test target node comprised in said network. Each of said test messages includes: parameters comprising a test message identifier being an identifier of the test message in the sequence, and a type identifier identifying the test message as a certain type associated with said parameters.

According to a third aspect of embodiments herein, the object is achieved by a computer program comprising instructions that when executed by a processing circuit causes said first node to perform the method according to the second aspect.

According to a fourth aspect of embodiments herein, the object is achieved by a carrier comprising the computer program according to the third aspect, wherein the carrier is one of an electronic signal, optical signal, radio signal or computer readable storage medium.

According to a fifth aspect of embodiments herein, the object is achieved by a first node for supporting obtaining of information regarding a Bluetooth mesh network operating according to a set of rules for propagating messages in the network. Said first node being configured to be able to operate comprised in said network and be operative as a test originator node. The first node is further configured to transmit, in accordance with said set of rules, a sequence of test messages towards a test target node comprised in said network. Each of said test messages includes: parameters comprising a test message identifier being an identifier of the test message in the sequence, and a type identifier identifying the test message as a certain type associated with said parameters.

According to a sixth aspect of embodiments herein, the object is achieved by a method, performed by a second node, for supporting obtaining of information regarding a Bluetooth mesh network operating according to a set of rules for propagating messages in the network. Said second node being comprised in said network. The second node receives at least some test messages of a sequence of test messages that have been transmitted by a test originator node towards a test target node and propagated in the network according to said set of rules. Said test originator node and said test target node being comprised in said network. Each of said test messages includes: parameters comprising a test message identifier being an identifier of the test message in the sequence, and a type identifier identifying the test message as a certain type associated with said parameters.

According to a seventh aspect of embodiments herein, the object is achieved by a computer program comprising instructions that when executed by a processing circuit causes said second node to perform the method according to the sixth aspect.

According to an eight aspect of embodiments herein, the object is achieved by a carrier comprising the computer program according to the seventh aspect, wherein the carrier is one of an electronic signal, optical signal, radio signal or computer readable storage medium.

According to a ninth aspect of embodiments herein, the object is achieved by a second node for supporting obtaining of information regarding a Bluetooth mesh network operating according to a set of rules for propagating messages in the network. Said second node being configured to be able to operate comprised in said network. The second node is further configured to receive at least some test messages of a sequence of test messages that have been transmitted, by a test originator node, towards a test target node and propagated in the network according to said set of rules. Said test originator node and said test target node being comprised in said network. Each of said test messages includes: parameters comprising a test message identifier being an identifier of the test message in the sequence, and a type identifier identifying the test message as a certain type associated with said parameters.

With said type identifier, e.g. operation code, associated with said parameters, receiving nodes, such as test target node(s) and intermediate node(s), are enabled to identify the type identifier and the parameters, and act on them, such as store information about them and thereby about the messages carrying the information. The stored information may thereafter be obtained and used, such as explained elsewhere herein, e.g. obtained from all nodes that the test messages has been received by on the way towards the test target node(s). This way information for the assessment of the network, its nodes, and performance thereof can be compiled and formed. For example:

success rates for nodes of the network when participating in receiving and/or (re)transmitting messages can be computed, it can be identified nodes of the network involved in propagation of messages in the network and/or be identified nodes of the network associated with a message propagation problem in the network, and propagation paths taken by the messages through nodes of the network can be found, thereby revealing information about a topology of the network and/or routes in the network.

Hence, embodiments herein provide an improvement regarding assessment of Bluetooth mesh networks and performance thereof.

BRIEF DESCRIPTION OF THE DRAWINGS

Examples of embodiments herein are described in more detail with reference to the appended schematic drawings, which are briefly described in the following.

FIG. 4a is an example of which test messages, identified by sequence numbers, that been received by a certain node when another node was test originator node, and vice versa.

FIG. 4b is a matrix example of success rates at different nodes regarding receipt of messages from neighbouring nodes.

DETAILED DESCRIPTION

Figure 1:
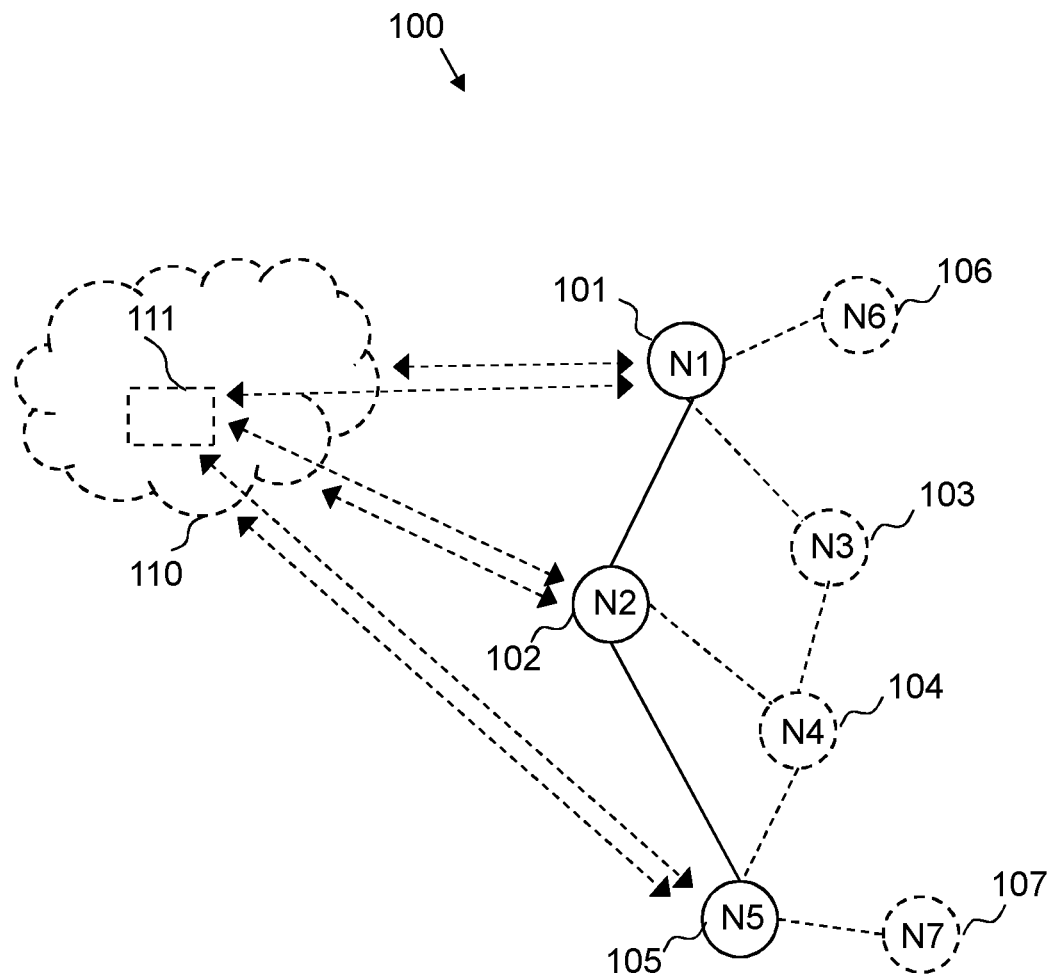
FIG. 1 is a block diagram schematically depicting an example of a Bluetooth mesh network in relation to which embodiments herein will be exemplified and may be implemented.

As part of the development towards embodiments herein, the situation indicated in the Background will first be further elaborated upon.

In order to assess the performance of a Bluetooth mesh network and be able to improve the performance, there must be typically be observability of key performance indicators of and in the mesh network. When investigating a mesh network with poor performance, information from each node, or at least as many nodes as possible, is desirable, e.g. to be able to identify where messages are lost in the network, where is a "bottleneck" etc.

Relays are nodes in the network that participate in forwarding messages. However, the relays cannot read the application data, thus they have no information about any lost application messages. Conventionally, it is typically only the source and destination for an application message that potentially can identify a certain message.

Hence, a solution should enable messages to be identified also by intermediate nodes, i.e. between source and destination nodes.

Embodiments herein, described in the following, support gathering of information that can be used for the mesh network assessment, even though the network else behave as a "black box".

In short, embodiments herein can be described as based on that a known sequence of test messages is sent from a source to a destination, herein named test originator node and test target node, wherein the latter may be several nodes. By forming the test messages so that they carry parameters that can be associated with a certain operation code, and which parameters should include at least indication of a sequence number of the test message in the sequence and preferably also an address of at least the test originator node, receiving nodes, including intermediate nodes, are able to identify the test messages as a special kind of messages.

Thereby, potentially all nodes, not only the test target node(s), in the network should be able to and preferably detect these test messages, and when possible log information about the test messages, preferably by storing the information locally. The stored information may then be retrieved from nodes involved, and/or the nodes may send the information to one or more nodes for managing stored, i.e. logged information, from multiple nodes. The stored information may relate to test messages of one or more sequences. Said one or more nodes may be test managing nodes that may be part of the network and/or external and may e.g. correspond to a gateway or backend node(s). The retrieval of stored information from several nodes may be done during a test or after the test, which test may involves transmitting and receiving the test messages of one or more sequences. When information from several nodes have been collected, the information can be post-processed and provide information about the network and/or its performance.

A test procedure based on embodiments herein should be relatively fast to conduct and if needed it can be repeated at different times to get information about the network performance over time.

FIG. 1 is a block diagram schematically depicting an example of a Bluetooth mesh network 100 in relation to which embodiments herein will be exemplified and may be implemented. Said Bluetooth mesh network, simply named the network 100 in the following, comprises network nodes 101-107, simply referred to as nodes 101-107 in the following, and that are named N1-N7 in the figure. The nodes 101-107 are communicatively connectable or connected to one or more of the other nodes by means of Bluetooth, such as BLE. In the figure, lines between the nodes 101-107 illustrate which have direct connections, or in other words have links, to each other. The network, the nodes and how they communicate may e.g. be in accordance with or based on said Bluetooth "Mesh Profile" specification. The nodes 101-107 typically correspond to devices that may be of different types, e.g. gateway, relay, friend, sensor etc.

The figure also shows a further network 110 and a further node 111. The further node 111 and/or the further network 110 may be located outside the network 100, i.e. be an external node and/or network, as indicated in the figure, or alternatively (not indicated in the figure) be comprised in the network 100 and thus be a network node thereof, such as a managing network node, e.g. a gateway. The further network node 111 may in principle be any node communicatively connected to the network 100 and nodes thereof, and not necessarily by Bluetooth.

Likewise, the further network 110 may be located outside the network 100, i.e. be an external network, as indicated in the figure, e.g. corresponding to a so-called computer cloud, often simply referred to as cloud, that may provide and/or implement services and/or functions relating to the network 100. It is implied that a network, including the further network 110, comprises interconnected network nodes and may e.g. include the further node 111 as indicated in the figure. The further network 110 may in principle be any network communicatively connected to the network 100.

The dotted arrows between the further network 110 and further node 111, and the network nodes, illustrate that they may be communicatively connected, directly or indirectly, i.e. via one or more other nodes and/or devices (not shown).

Attention is drawn to that FIG. 1 is only schematic and for exemplifying purpose and that not everything shown in the figure may be required for all embodiments herein, as should be evident to the skilled person.

Figure 2:
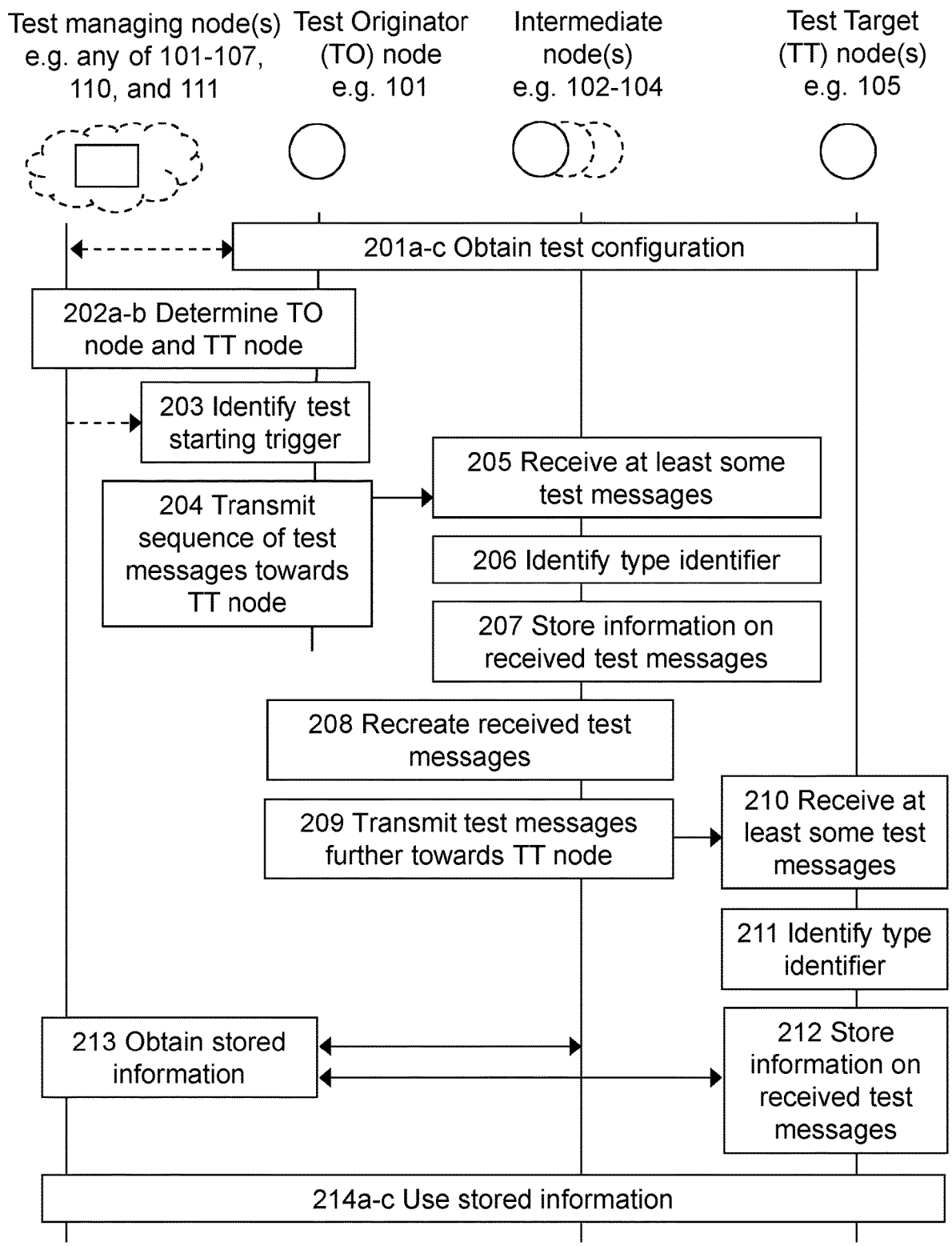
FIG. 2 is a combined signalling diagram and flowchart for describing and discussing some examples and embodiments herein in relation to said network.

FIG. 2 is a combined signalling diagram and flowchart for describing and discussing some examples and embodiments herein relating to a method for supporting obtaining of information regarding a Bluetooth mesh network, e.g. the network 100, operating according to a set of rules for propagating messages in the network 100.

The Bluetooth mesh network may e.g. be a network setup in accordance with or based on the Bluetooth(s) Specification Mesh Profile, v1.0.

The set of rules, typically predefined rules, may e.g. be rules for propagating messages according to flooding, e.g. a flooding algorithm that the network 100 operates in accordance with, or according to a routing protocol and routes that have been created and the network 100 is operating according to. As should be understood, the set of rules should be such that normally and conventionally are used when messages and data in general are transmitted in the network 100, e.g. from any source node to a destination node in the network 100.

In the figure and in the following, the further node 111 and/or the further network have been selected as examples of test managing node(s), the node 101 has been selected as example of a Test Originator (TO) node, the nodes 102-104 have been selected as examples of intermediate nodes and the node 105 has been selected as example of a Test Target (TT) node. However, in principle, any node in the network 100 could act as TO node, TT node and/or intermediate node. For example, in another setup than exemplified below, the node 102 or 106 may be TO node, the node 101 may be intermediate node and the node 104 or 107 may be TT node.

The actions below may be taken in any suitable order and/or be carried out fully or partly overlapping in time when this is possible and suitable.

Actions 201a-c

The TO node, the TT node and/or the intermediate nodes may obtain test configurations, respectively, e.g. receive the test configuration(s) from an external source, e.g. the test managing node(s), and/or obtain it by other means, e.g. as part of installation in the network 100 and/or that the nodes actively retrieve the test configurations from the external source. The present actions may be performed at any point in time before performing further actions below. The test configuration may e.g. be a configuration associated with and/or as preparation for a test or tests to be executed as described in the following. Each test configuration may be obtained as part of that all nodes, or all test supporting nodes, of the network 100 at some point in time are configured to be prepared and ready for such test or tests. It may be a general configuration for such test or the configuration may be specifically associated with a certain test to be executed.

Each node may also or alternatively be pre-configured and/or configured to by default support execution of at least some test(s), e.g. as below.

Possible content of the test configuration(s) are discussed separately below.

Actions 202*a-b*

A node, e.g. the node 101 of the network 100, may be determined, e.g. by selection, and at least one other node, e.g. node 105 of the network 100, may be determined, e.g. by selection, to be TT node.

The determination may be made by a node to become the TO node, e.g. node 101. That is, the node 101 may determine itself which node(s) that shall be, i.e. act, as the TO node and/or TT node of test(s) to be executed. Thus, in some embodiments, a node, e.g. the node 101, may determine itself as TO node, e.g. based on the test configuration described above, or, for example, the test managing node(s) may determine and send an indication to a node, e.g. the node 101, to become the TO node. The indication may indicate to the node it is sent to, i.e. a receiving node, e.g. the node 101, that this node shall be TO node for at least one test execution. It may also indicate which node(s), typically identified by their addresses in the network 100, that shall be TT node(s). Typically, there at least is determination of TO node, since TT node(s) may be several nodes and e.g. may be predetermined, such as discussed separately below.

In some embodiments, TO node and/or TT node may be determined by the test configuration(s).

There may be multiple tests as described below executed with different nodes as TO node and/or TT node(s), and in that case the present action may be performed once per test to be executed, e.g. the test managing nodes(s) may according to some embodiments determine different nodes to be the TO node and/or TT node(s) for multiple tests involving different nodes as TO and/or TT node(s).

Action 203

The TO node, e.g. node 101 determined in the previous action, may identify a test starting trigger. The trigger may be an internal event, e.g. that a certain point in time is reached, which may be according to or based on some parameter(s) of said obtained test configuration. Another option is that the test managing node(s) sends some test triggering signal to the TO node, such as a command to initiate or start test execution, that the TO node receives, identifies and then may react on. In some embodiments, the test starting trigger may be the same or corresponding signal or event that in the previous action was involved in determining which node(s) to be the TO node and/or TT node(s).

Action 204

The TO node, e.g. node 101, transmits, in accordance with said set of rules, a sequence of test messages towards said TT node, e.g. node 105. The transmission may start in response to identification of the test starting trigger in the previous action and/or may be based on the test configuration obtained in Action 201*a* for the TO node. The sequence, i.e. the total number of test messages thereof, may be of a predetermined length or e.g. based on the test configuration obtained for the TO node.

Each of said test messages should include:

parameters comprising a test message identifier being an identifier of the test message in the sequence; and a type identifier identifying the test message as a certain type associated with said parameters.

The test message identifier may be a sequence number indicator indicating an order of the test message in the sequence, e.g. be a sequence number, possibly in combination with some further identifying information, e.g. identifying the message source, such as test originator node as discussed below, and/or a specific test that the sequence belongs to. In some embodiment, the test message identifier may also identify the sequence, e.g. identify it among other sequences of test message, e.g. in a sequence group or among other sequences transmitted closest in time before and after the sequence of said test messages.

The certain type that the test message may be identified as, may be thus be a certain message type, which certain message type thus may correspond to such test message as discussed herein. The type identifier typically is or corresponds to an operation code, e.g. such as defined in said "Mesh Profile" specification. The type identifier, e.g. operation code, may be a certain operation code and/or be specifically associated with the parameters and the sequence of test messages, e.g. may be an operation code that may be predetermined and/or is predetermined to be associated with the parameters, and e.g. be specified in future revisions of said "Mesh Profile" specification.

The type identifier, e.g. operation code, and the parameters of each test message are preferably included in a transport Packet Data Unit (PDU) of the test message. The operation code and associated parameters may follow what is defined in said "Mesh Profile" specification.

Thanks to the test messages with the type identifier associated with said parameters, receiving nodes, such as test target node(s) and intermediate node(s), as discussed in the next actions, become enabled to identify the type identifier and the parameters, and act on them, such as store information about them and thereby about the messages carrying the information. The stored information may thereafter be obtained from multiple nodes and used, such as explained elsewhere herein, and thereby information for assessment of the network can be formed.

In some embodiments, said parameters further comprise a test originator, i.e. TO, address being an address of the TO node, here the node 101 in the network 100 and/or a test target, i.e. TT, address being an address of the TT node, e.g. node 105 in the network 100.

Each of said test messages being transmitted towards the TT node, e.g. the node 105, may be further associated with an indication that the test message shall be excluded from further propagation by a receiving node. Exclusion of further propagation, or in other words forwarding, of a message means that the message is not further propagated or forwarded. The indication may be a Time To Live (TTL) parameter set to a value indicting this, e.g. a TTL parameter set to 0, i.e. TTL=0. The parameter may be comprised in a TTL field of the test message. Such indication in the test messages may be required to enable identifying the type identifier of a received message as discussed below.

Action 205

One or more intermediate nodes, e.g. the nodes 102-104, may receive at least some of said transmitted test messages of the sequence after having propagated in the network 100 according to said set of rules. For example, node 102 may receive at least some of the test messages of the sequence transmitted from node 101 as TO node, and/or node 103 may receive at least some of the test messages of the sequence transmitted from node 101 as TO node. Further, node 104 may receive at least some of the test messages of the sequence transmitted from node 101 after having been retransmitted by bode 103, e.g. as discussed in the following actions.

It should be understood that the intermediate nodes are nodes of the network that are located along one or more message propagating paths in the network 100 between the TO node, e.g. node 101, and the TT node, e.g. node 105, and which message propagation paths comply with said set of rules.

Reason it may be only some test messages that are received may be that some messages of the sequence are lost along the way, e.g. during transmission, due to various problem as discussed further below. However, from the test perspective, this is desirable since the test messages propagating through the network 100 are meant to be indicative for how other, such as conventional messages, also would propagate in the network, but with the difference that test messages, thanks to said type identifier and the associated parameters, can be logged and identified along their propagation path.

Action 206

Each of said one or more intermediate nodes, e.g. nodes 102-104, may for each received test message in Action 205, identify said type identifier of the received test message.

Action 207

Each of said one or more intermediate nodes, e.g. nodes 102-104, may, in response to the identification in Action 206, then store information regarding the received test messages based on one or more of said parameters. For example, it may be stored test message identifiers, e.g. sequence number, of the received test messages and/or TO address and/or TD address. The storing may be as discussed above, but is typically locally stored, such as stored in the node itself.

Action 208

This action may be performed by said one or more intermediate nodes for which said set of rules support further propagation of received test messages. These node(s) may recreate the received test messages, such that the test messages to be further propagated, or in other words be forwarded or (re)transmitted further, such as in the next action, will be recreated test messages with at least the same type identifier and at least some parameters as the received test messages, but comprising source addresses that are addresses in the network of said intermediate nodes, respectively.

The test messages may also comprise destination addresses. Each test message may thus comprise a source address and destination address separate from the address(es) comprised in said parameters, such as the TO address and/or the TT address. However, although a test message may be recreated by an intermediate node with a source address being the address of the intermediate node, the destination address may be kept and remain the same as in the received message, which may correspond to the TT address, if any.

Further, test message may be recreated with such indication mentioned above that excludes further propagation, e.g. with TTL=0, i.e. that may be the same as in the received test messages. Hence, test messages are here recreated and (re)transmitted despite there may be a TTL=0 in the received test message.

An additional requirement for the present action to be performed by an intermediate node may be that the same or corresponding test message has not already been further propagated by the intermediate node. A message may be considered as the same or corresponding test message even though it has been recreated if it has the same test message identifier as a previously received and/or stored test messages by the intermediate node. Reason for this requirement is that flooding, e.g. if said set of rules correspond to a flooding algorithm, else, at least in some situations, may cause the same message to be transmitted back again and thereby cause an undesired "ping pong" effect.

Action 209

This action may also be performed by said one or more intermediate nodes for which said set of rules support further propagation of received test messages. These node(s) may transmit, in accordance with said set of rules, each received test message further towards the test target node. These test messages may be recreated test messages as discussed above for Action 207. The same additional requirement as described above for Action 208 may apply also for the present action.

Action 210

The TT node, e.g. node 105, may receive at least some of said transmitted test messages of the sequence after having propagated in the network 100 according to said set of rules. The received test messages(s) may thus be received directly from the TO node and/or from and/or via one or more intermediate nodes as discussed above.

Action 211

The TT node, e.g. node 105, may further identify, for each received test message, said type identifier of the received test message.

The TT node may further identify itself as being the TT node and/or destination node of a received test message based on that its own address is the same as the destination address and/or test target address comprised in the received test message. The TT node may then act accordingly and e.g. refrain from recreating the test message and/or (re)transmitting it further, i.e. refrain from acting as an intermediate node as described above.

Correspondingly, an intermediate node may further identify itself as being an intermediate node based on that its own address differ, i.e. is not the same, as the destination address and/or test target address comprised in the received test message. The intermediate node may then act accordingly, and e.g. act as described above.

Action 212

The TT node, e.g. node 105, may, in response to the identification in Action 211, store information regarding the received test messages based on one or more of said parameters. The information stored, e.g. being logged, may correspond to what is stored by intermediate nodes, e.g. as discussed for Action 207 above.

Action 213

Information that has been stored according to Action 207 and/or Action 212 by, and typically in, several nodes may then be obtained, e.g. obtained from said TT node, e.g. the node 105, and/or from said one or more intermediate noes, e.g. nodes 102-104.

Any node of the network 100 may in principle obtain this information if capable of doing so, i.e. the obtaining may be performed by any of the nodes of the network 100, e.g. any one of nodes 101-107, including those participating in transmitting and/or receiving the test messages, but typically it is required and/or desirable that the node has certain capabilities, e.g. regarding storage and computing. It may e.g. be a gateway node. It may alternatively be one or more modes external from the network 100, e.g. the further network 110 and/or further node 111. The node(s) obtaining the information may be test managing node(s) that may, but not necessarily, be the same test managing nodes as described above as possibly being involved in providing test configuration(s), and/or determining the test originator node and test destination node(s), and/or involve in starting the test, e.g. by providing a test starting trigger to the test originator node.

The same node starting the test, e.g. by said test starting trigger and/or by providing the test configurations, may, but not necessarily, also be involved in obtaining the information in the present action, e.g. test managing node(s), and may e.g. be the only node(s) allowed and/or able to obtain the stored information from the nodes that have stored it. This may e.g. be accomplished by cryptography and/or identifying keys.

Actions 214*a-c*

The obtained stored information from Action 213 may then be used in various ways to e.g. provide or form information for assessment of the network 100. Using the information may involve one or several nodes, which the figure attempts to illustrate by that Actions 214*a-c* are drawn as being performed by several different nodes. However, the figure is only an example and not all of these nodes may or need be involved in the present action.

Some example of use to are provided and indicated in the following and at other places in the present disclosure. For example:

It may be computed, based on the obtained stored information from the TT node, e.g. the node 105, and/or the from said one or more intermediate nodes, e.g. the nodes 102-104, success rates for the TT node and/or for said one or more intermediate nodes, respectively. Each success rate may indicate how many of the test messages of the sequence transmitted by the TO node, e.g. node 101, were received by respective node associated with the success rate.

It may be identified, based on the obtained stored information, nodes of the network 100 involved in propagation of messages in the network 100, and/or nodes of the network 100 redundant for propagation of messages in the network 100, and/or nodes of the network 100 associated with a propagation problem of messages in the network 100.

It may be identified, based on test message identifiers comprised in the obtained stored information, propagation paths taken by the test messages through nodes, e.g. the nodes 101-105, of the network, thereby revealing information about a topology of the network 100 and/or routes in the network 100 according to said set of rules.

Figure 3:
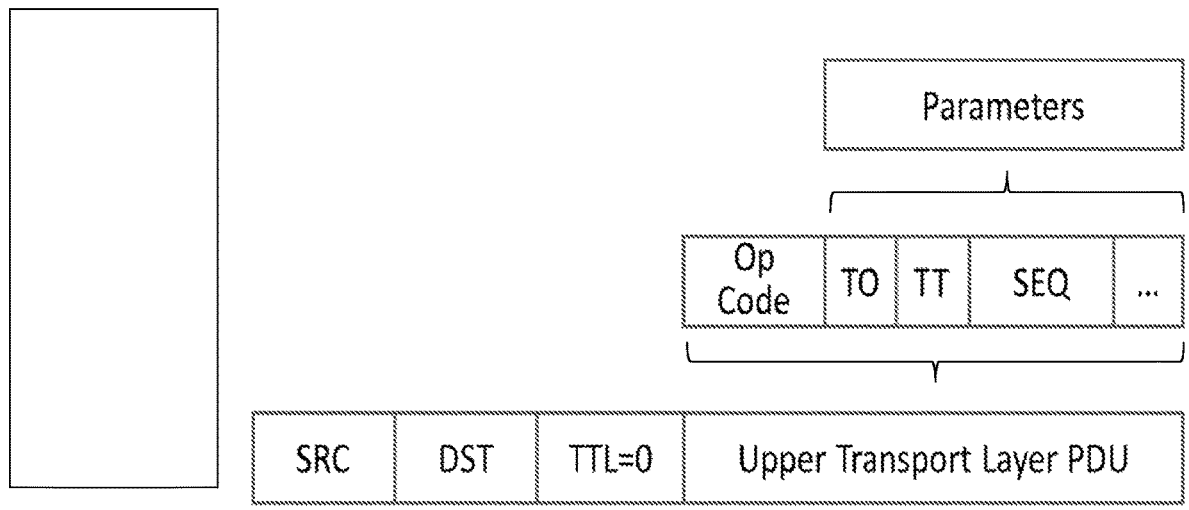
FIG. 3 illustrates in a schematic manner an example of content of a test message used in embodiments herein.

FIG. 3 illustrates in a schematic manner an example of content of and how a test message used in embodiments herein can be formed. What is shown may correspond to different fields of data structures comprised in the test messages. In the shown example the Op Code field may contain a type identifier as discussed above in the form of an operation code, e.g. complying with said "Mesh Profile" specification. The type identifier and the operation code thus correspond to a message differentiation, allowing test messages to be identified as a special type of message compared to other messages. There may be specified certain, e.g. new, one or more specific operation codes, for identifying and thus enabling to differentiate test messages according to embodiment herein from other messages.

Further, the TO field may contain an address of a TO node, e.g. address of node 101 in the network 100, the TT field may contain an address of a TT node, e.g. address of nod 105 in the network 100. The SEQ field may contain a sequence number that is an example of the test message identifier discussed above and may thus be a sequence number of the test message in a sequence of test messages, e.g. a number in a sequence 0-31 or 0-63, i.e. when there is a sequence of 32 or 64 test messages. The TO, TT and SEQ field, and possible other fields with further data, may be part of the parameters discussed in the foregoing. The parameters may e.g. further comprise other fields and/or data relevant for this kind of test, such as transmission power used by a node, e.g. of source node (SRC), for transmitting the message, cumulative number of hops etc.

The upper part of the figure, with the OP Code and the Parameters, may be constructed in the transport layer, specifically in the Upper Transport Layer. The Op code and the Parameters may then be comprised in a transport layer PDU, or more specifically an Upper Transport Layer PDU.

The transport layer PDU may then on the network layer be associated with a SRC field and/or a DST field and/or a TTL-field. The SRC field may contain a source address of the node that transmitted, and possibly recreated the test message. The DST field may contain a destination address or range of destination addresses of node(s) to receive the message. The TTL-field may contain a TTL value that typically should be 0, as discussed above.

For example, if the network 100 apply flooding, i.e. operate according to a flooding algorithm and thus the set of rules are in accordance with this, and the node 101 is test originator node, then: In a first transmitted test message of a sequence, TO and SRC is the address of the node 101 in the network 100, TT and DST may e.g. be 0xFFFE corresponding to an "all relays" group address, i.e. a range of addresses, targeting in principle all nodes or at least all relays as TT nodes, or may e.g. be a single, i.e. unicast, address of a specific node being the TT node. The SEQ may be 0, identifying it is the first test message of the sequence. The node 102 may then receive this test message and recreate it so that it when it is transmitted further, e.g. towards the node 103 as destination, i.e. the node 102 is acting as intermediate node, the TO would still be the address of the node 101 in the network 100, but SRC would be the address of the node 102 in the network 100. The rest of the fields may contain data as before.

As indicated above, TTL, i.e. Time-To-Live, refers to a number limiting the number of hops for a message, and thus, TTL=0 means a single hop transmission, i.e. no relaying.

Hence, in some embodiments, the DST, and also the TT, may contain 0xFFFE, i.e. the "All relays"-group address. Alternatively, in some embodiments, the DST is a range of pre-allocated addresses and one DST address may represent one sequence number. For example, if the test includes 32 messages, then the DST addresses may be FF00-FF1F, i.e. 32 unique addresses. These pre-allocated addresses should be known to all nodes in the network, e.g. the network 100, e.g. through test configuration(s). In this case, SEQ may be excluded in the Parameters. Moreover, in some embodiments, the DST may contain a pre-allocated group address, e.g. as above, and then the SEQ and sequence number may be part of the parameters.

When a node, e.g. relay, in a flooding case receives a test message, it may log the associated parameters. Once a test message is received by the node, the message type can be identified by means of the Op Code field. Then, the node may recreate the test message before transmitting it further, e.g. based on the received information. In the network layer, the SRC field may be filled with the network address of the node. The destination address, DST, may be set to the same address as the received message. The TTL field should be set to 0. In the transport layer PDU part, the Op Code is preferably kept the same. In the transport layer PDU, the TO, TT and SEQ fields may be kept the same as in the incoming message. Other possible fields in the PDU, e.g. comprised in the parameters discussed above, may have to be changed, added and/or computed, such as cumulative number of hops and/or RSSI of the received test message.

In case of routing instead of flooding, the message format discussed above may still be used and applied. However, one difference is e.g. that in the routing case, the TD and DST may e.g. be 0xFFFB corresponding to an "all routing nodes" group address.

When a node, e.g. relay, in a routing case receives a test message, it may log the associated parameters. The SRC and DST fields, and possibly also the TO and TT fields, may be used to explore a local routing table. If the routing table has a corresponding routing entry, the test message should be forwarded with the test message first recreated by the receiving node. In other words, in case of routing, a test message should only be propagated according to an existing route. In the network layer, the SRC field may be made to contain the address of receiving node that shall further transmit the test message according to the route. The DST may be the same as in the received test message. In the transport layer PDU, the TO, TT and SEQ fields may be kept the same as in the received test message. Other possible fields in the PDU, e.g. comprised in the parameters discussed above, may have to be changed, added and/or computed, such as cumulative number of hops and/or RSSI of the received test message.

FIG. 4a is a schematic example where test messages 0-15, i.e. a sequence of 16 test messages, identified by sequence numbers as test message identifiers have propagated through a network, e.g. the network 100. The test messages indicated in the figure have in this example been received by the node 105, i.e, N5, as TT node or intermediate node when the node 101, i.e. N1, was test TO node, and vice versa. That is, there have been two tests with one test sequence each, in opposite directions. The sequence numbers may be logged by, i.e. stored, by the nodes. Any intermediate node that also may have carried the test messages may have stored corresponding numbers. It is thus possible to "trace" sequence numbers identifying individual test messages of the sequence and how they have propagated through the network 100. Also, success rates can be calculated at various nodes, based on each test and/or on multiple tests at different points in time.

FIG. 4b is a matrix example of such success rates for different nodes regarding receipt of messages from other neighbouring nodes have been calculated. For example, from the example it can be read that about 66% of messages sent by N2 are received by node N4. The reverse direction had 75% success rate. A low percentage indicates problems with a hop and/or involved nodes.

As already mentioned, each node that receives a test message may log, i.e. store, information about the test messages, for instance, in addition to sequence number as shown in FIG. 4a, there may be information on e.g. message source, signal strength and/or signal quality etc. It is thus possible to provide also other matrices than in FIG. 4b for one and the same network and/or nodes but with other information based on what have been logged and possibly after some post-processing. Information that has been logged, i.e. stored, can be used as an aggregation over multiple sequences, and/or all test messages of a sequence, and/or per sequence number.

Thanks to the logging of test messages sent, and thus information stored about them, also at intermediate nodes, a very clear picture can be achieved of how messages in general travel through the network and it is enabled to compute and/or illustrate performance and topology in different ways. It can be identified where messages are lost etc.

Figure 5A:
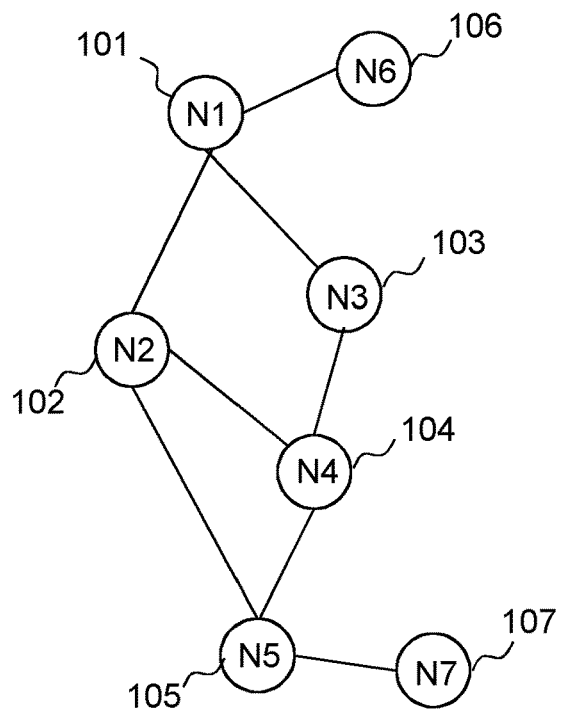
FIG. 5a is a schematic example illustrating a network topology of a Bluetooth mesh network that can be identified thanks to embodiments herein.

FIG. 5a is a schematic example illustrating that a network topology of a Bluetooth mesh network, e.g. the network 100, can be identified thanks to embodiments herein. By e.g. logging resulting in a matrix as shown in FIG. 4b and/or tracing sequence numbers that have been stored at different nodes when a test message propagates through the network 100, paths such as links between nodes can be identified, e.g. revealing the topology shown in the figure.

Figure 5B:
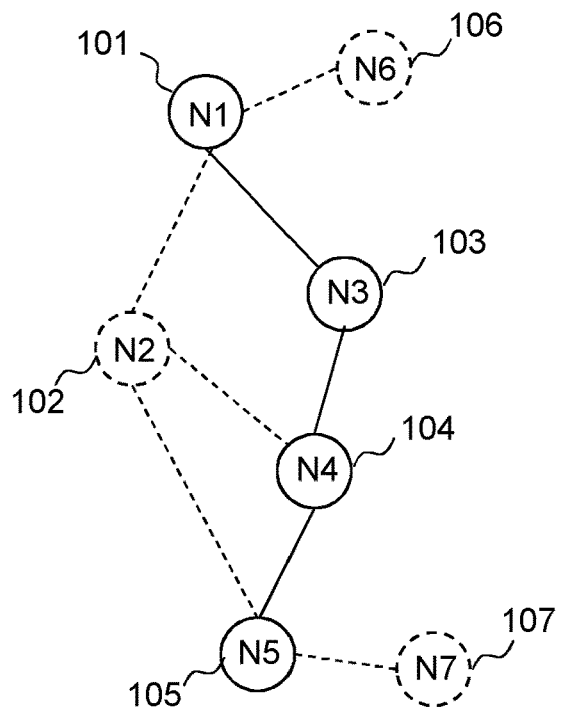
FIG. 5b is a schematic example illustrating a route in a Bluetooth mesh network, which route can be identified thanks to embodiments herein.

FIG. 5b is a schematic example illustrating a route in a Bluetooth mesh network, in which a route has been identified thanks to embodiments herein. In a routing case, messages, including test messages, travel along routes and thus these can be identified thanks to embodiments herein by e.g. tracing individual sequence numbers. For example, it can be identified, as illustrated in the figure, that there is route between N1 and N5 through N3 and N4.

In general, stored information can be used to answer at lot of different questions about performance of a Bluetooth mesh network, for example:
Does all nodes work (carry traffic)?
Are there problems with any hop?
How many messages were received by node x?
Is it bad coverage anywhere?
What is the topology of the mesh network?
Which route(s) is taken by the messages?

Embodiments herein and proposed testing functions may be implemented through a new standardized foundation model, herein called "Test Model" and/or as a standard application model and/or or a proprietary application, preferably by all nodes in Bluetooth mesh network to be assessed.

Content, such as locally stored information by nodes, may be accessed using a device key, which may be a key that is only known by a network administrator and each device itself.

Different states defined in the model can be used control a test, e.g., to start and stop the test and/or logging, i.e. storing, procedure and to configure the tests message sending behaviour. The parameters can either be predefined or communicated in test configuration messages sent to all nodes, e.g. corresponding to the test configuration(s) discussed above in connection with FIG. 2. Such test configuration messages are preferably sent in so called acknowledged mode.

The test configuration of the model may include various relevant parameters, such as, just to mention some examples:
Time to start the test. For instance, immediately or some future time instant.
Time to end the test. For instance, immediately, or some future time instant.
What to log, i.e. information to store, during the test. For instance, sequence number, signal strength, signal quality, message source, threshold, such as a filter threshold based on signal strength, cumulative number of hops etc.

A number of test messages of a sequence to be used when executing a test.

A message format configuration. For instance, include sequence number and/or transmit power etc, in the test message payload, such as among the parameters discussed above.

A log, i.e. storage, format to be used. For instance, compact or full, relating to which and/or how much information to be stored.

If the recorded logs, i.e. stored information, shall be sent immediately to a given destination, or only on request, i.e. that stored information has to be retrieved from the nodes and not provided automatically by the node that have stored it.

TO node, corresponding to a source address of the test and from where the sequence of test messages is transmitted.

TT node(s), corresponding to destination address(es) of the sequence of test messages.

The receiver of the logs, e.g. if there are some test managing node(s) where stored information shall be sent to and/or that should be allowed to access the stored information.

If tests shall be executed repeatedly, e.g. be periodic or not, and e.g. a periodicity if so.

Test message duration and number of repetitions.

As an example, model states of the Test Model may be organized in one or more of the following categories:

Test Message Configuration State
Test Start Time
Test Stop Time
Test duration
Is Periodic Test message
Test message interval
Number of Test messages
Test Message Log Configuration State
Log format
Log content (bit mask)
Number of received message
Start Logging time
Received Log List
Test Message Format Configuration State
Message Test Originator Address
Message Test Target Address
Message format pattern (bit mask)

Further, as an example, model messages of the Test Model may include one or more of the following messages:

Start testing
Start logging
Send log
Clear log
Abort test
Stop testing
Stop logging As already discussed above, a test is carried out between a TO node and one or more TT nodes. For instance, the TO node may be a sensor or an actuator. The TT node may be a gateway or any other node(s) of interest. The TO node sends a sequence of test messages towards the TT node(s). Besides in the TT node(s), test messages may also be logged, i.e. information stored, in intermediate nodes that receive and/or forward them.

The test procedure for a node may look a bit different depending on the device that corresponds to the node and its capabilities. It may e.g. differ a bit for different node types. A battery driven sensor, or similar, may e.g. only be able to send test messages and may thus e.g. only be TO node. A relay may on the other hand store information about the test messages and forward received messages, and may be any one of a TO node, TT node or intermediate node. A gateway may store the information about the test messages and forwards the message if it has relaying capabilities and may thus also be any one of a TO node, TT node or intermediate node.

Figure 6:
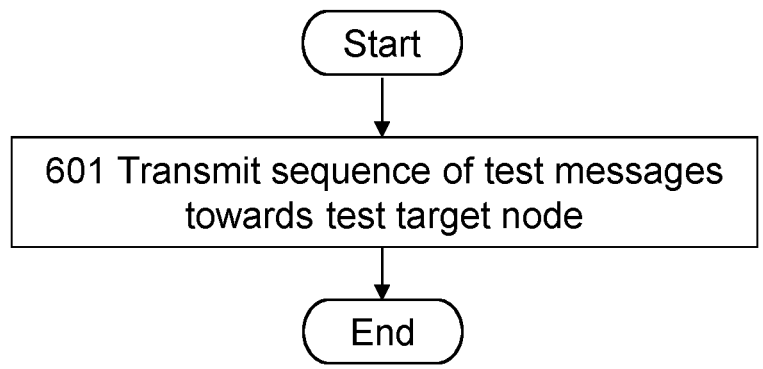
FIG. 6 is a flowchart schematically illustrating embodiments of a method performed by a first node.

FIG. 6 is a flowchart schematically illustrating embodiments of a method, performed by a first node, e.g. the node 101, for supporting obtaining of information regarding a Bluetooth mesh network, e.g. the network 100. The network operates according to a set of rules for propagating messages in the network 100. Said first node is comprised in said network and operative as, and in the following referred to as, a test originator node.

The method comprises the following action.

Action 601

The first node 101 transmits, in accordance with said set of rules, a sequence of test messages towards a test target node, e.g. the node 105, comprised in said network. Each of said test messages includes:

parameters comprising a test message identifier being an identifier of the test message in the sequence, and a type identifier identifying the test message as a certain type associated with said parameters.

In some embodiments, said parameters further comprise one or more of the following: a test originator address being an address of the test originator node, e.g. node 101 in the network 100, and a test target address being an address of the test target node in said network, i.e. here of the node 105 in the network 100.

Moreover, in some embodiments, each of said test messages being transmitted towards the test target node, i.e. here node 105, is further associated with an indication that the test message shall be excluded from further propagation by a receiving node.

This action may fully or partly correspond to action 204.

Figure 7:
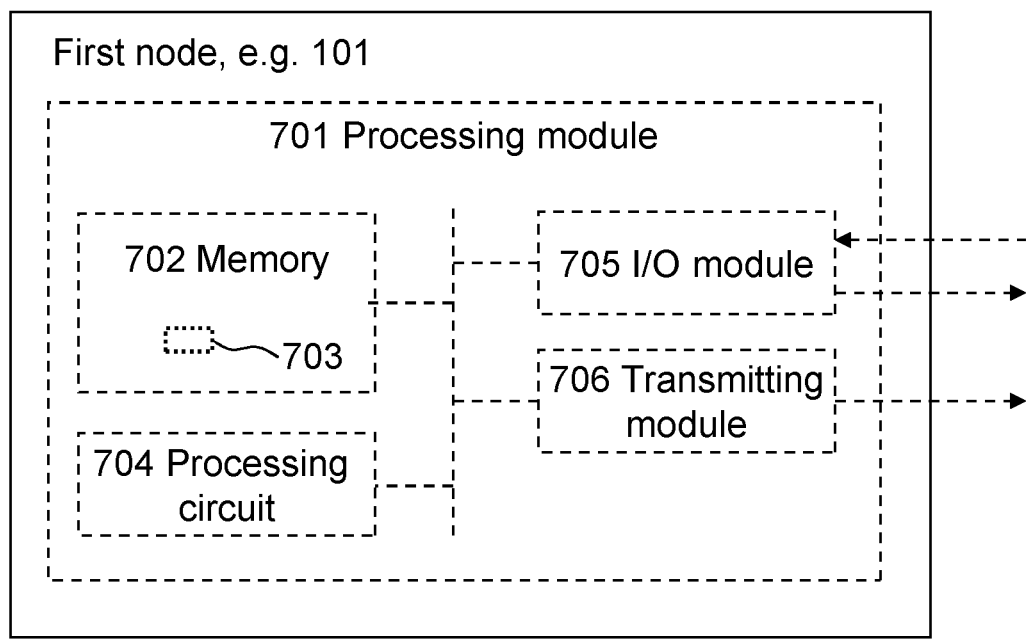
FIG. 7 is a functional block diagram for illustrating embodiments of the first node.

FIG. 7 is a schematic block diagram for illustrating embodiments of the first node, e.g. the node 101, for supporting obtaining of information regarding a Bluetooth mesh network, e.g. the network 100, operating according to a set of rules for propagating messages in the network. The figure is particularly for illustrating how the first node may be configured to perform the method and actions discussed above in connection with FIG. 6. Hence, said first node is configured to be able to operate comprised in said network, i.e. node 101 in the network 100, and be operative as a test originator node.

Said first node may comprise a processing module 701, such as a means, one or more hardware modules, including e.g. one or more processors, and/or one or more software modules for performing said methods and/or actions.

Said first node may further comprise a memory 702 that may comprise, such as contain or store, a computer program 703. The computer program 703 comprises 'instructions' or 'code' directly or indirectly executable by said first node so it performs said method and/or action. The memory 702 may comprise one or more memory units and may be further be arranged to store data, such as configurations and/or applications involved in or for performing functions and actions of embodiments herein.

Moreover, said first node may comprise a processing circuit 704 as an exemplifying hardware module and may comprise or correspond to one or more processors. In some embodiments, the processing module 701 may comprise, e.g. 'is embodied in the form of' or 'realized by' the processing circuit 704. In these embodiments, the memory 702 may comprise the computer program 703 executable by the processing circuit 704, whereby said first node is operative, or configured, to perform said method and/or actions.

Typically, said first node, e.g. the processing module 701, comprises an Input/Output (I/O) module 705, configured to be involved in, e.g. by performing, any communication to and/or from other units and/or nodes. The I/O module 705 may be exemplified by an obtaining, e.g. receiving, module and/or a providing, e.g. sending or transmitting, module, when applicable.

In further embodiments, said first node, e.g. the processing module 701, may comprise a transmitting module 706 as exemplifying hardware and/or software module(s).

Therefore, according to the various embodiments described above, said first node, e.g. the node 101, and/or the processing module 701 and/or the processing circuit 704 and/or the I/O module 705 and/or the transmitting module 706, are operative, or configured, to transmit, in accordance with said set of rules, said sequence of test messages towards the test target node, e.g. the node 105.

Figure 8:
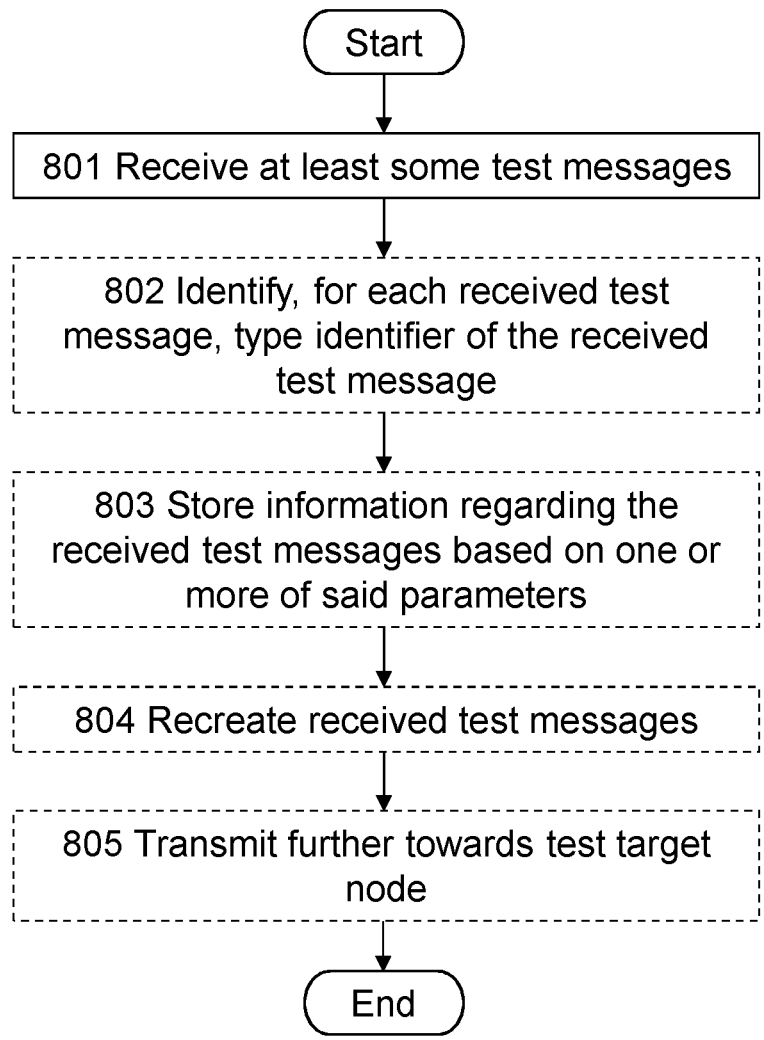
FIG. 8 is a flowchart schematically illustrating embodiments of a second node.

FIG. 8 is a flowchart schematically illustrating embodiments of a method, performed by a second node, e.g. any one of the nodes 102-105, for supporting obtaining of information regarding a Bluetooth mesh network, e.g. the network 100. The network operates according to a set of rules for propagating messages in the network. Said second node is comprised in said network. The second node may be operative as a test target node or intermediate node.

The method comprises the following actions, which actions may be taken in any suitable order and/or be carried out fully or partly overlapping in time when this is possible and suitable.

Action 801

The second node receives at least some test messages of a sequence of test messages that have been transmitted by a test originator node, e.g. the node 101, towards a test target node, e.g. the node 105, and propagated in the network 100 according to said set of rules. Said test originator node, e.g. node 101, and said test target node, e.g. node 105, are also comprised in said network. Each of said test messages includes:

parameters comprising a test message identifier being an identifier of the test message in the sequence, and a type identifier identifying the test message as a certain type associated with said parameters.

In some embodiments, said parameters further comprise one or more of the following: a test originator address being an address of the test originator node, i.e. here node 101 in the network 100, and a test target address being an address of the test target node in said network, i.e. here of the node 105 in the network 100.

Moreover, in some embodiments, each of said test messages being transmitted towards the test target node, i.e. here node 105, is further associated with an indication that the test message shall be excluded from further propagation by a receiving node.

This action may fully or partly correspond to actions 205 or 210.

Action 802

Said second node may identify, for each received test message, said type identifier of the received test message.

This action may fully or partly correspond to actions 206 and/or 211.

Action 803

Said second node may store, in response to the identification, information regarding the received test messages based on one or more of said parameters.

This action may fully or partly correspond to actions 207 and/or 212.

Action 804

Said second node may recreate, if the set of rules supports further propagation of received test messages, the received test messages so that each becomes a recreated test message with at least the same type identifier and parameters as the received test message but comprising a source address that is an address in the network of said second node.

This action may fully or partly correspond to action 208.

Action 805

Said second node may, in accordance with said set of rules and if the set of rules supports further propagation of received test messages, transmit each received test message further towards the test target node, e.g. the node 105. In case Action 804 has been performed, each test message transmitted further is a recreated test message.

This action may fully or partly correspond to action 209.

Figure 9:
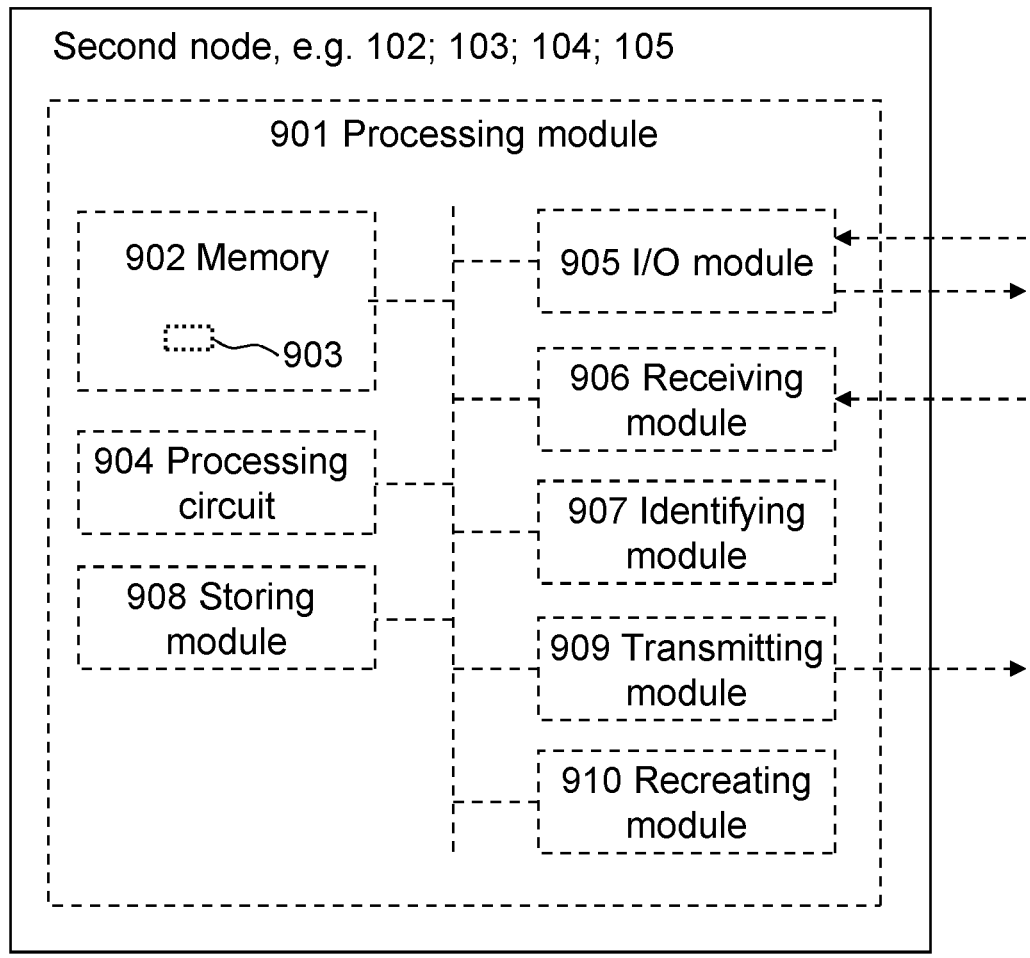
FIG. 9 is a functional block diagram for illustrating embodiments of the second node.

FIG. 9 is a schematic block diagram for illustrating embodiments of the second node, e.g. any one of the nodes 102-105, for supporting obtaining of information regarding a Bluetooth mesh network, e.g. the network 100, operating according to a set of rules for propagating messages in the network. The figure is particularly for illustrating how the second node may be configured to perform the method and actions discussed above in connection with FIG. 8. Hence, said second node is configured to be able to operate comprised in said network, e.g. node 101 in the network 100, and be operative as a test originator node.

Said second node may comprise a processing module 901, such as a means, one or more hardware modules, including e.g. one or more processors, and/or one or more software modules for performing said methods and/or actions.

Said second node may further comprise a memory 902 that may comprise, such as contain or store, a computer program 903. The computer program 903 comprises 'instructions' or 'code' directly or indirectly executable by said second node so it performs said method and/or action. The memory 902 may comprise one or more memory units and may be further be arranged to store data, such as configurations and/or applications involved in or for performing functions and actions of embodiments herein.

Moreover, said second node may comprise a processing circuit 904 as an exemplifying hardware module and may comprise or correspond to one or more processors. In some embodiments, the processing module 901 may comprise, e.g. 'is embodied in the form of' or 'realized by' the processing circuit 904. In these embodiments, the memory 902 may comprise the computer program 903 executable by the processing circuit 904, whereby said second node is operative, or configured, to perform said method and/or actions.

Typically, said second node, e.g. the processing module 901, comprises an Input/Output (I/O) module 905, configured to be involved in, e.g. by performing, any communication to and/or from other units and/or nodes. The I/O module 905 may be exemplified by an obtaining, e.g. receiving, module and/or a providing, e.g. sending or transmitting, module, when applicable.

In further embodiments, said second node, e.g. the processing module 901, may comprise a receiving module 906, an identifying module 907, a storing module 908, a transmitting module 909 and/or a recreating module 910, as exemplifying hardware and/or software module(s).

Therefore, according to the various embodiments described above, said second node and/or the processing module 901 and/or the processing circuit 904 and/or the I/O module 905 and/or the receiving module 906, are operative, or configured, to receive, said at least some test messages of the sequence of test messages that have been transmitted by the test originator node, e.g. the node 101, towards the test target node, e.g. the node 105, and propagated in the network according to said set of rules.

Moreover, in some embodiments, said second node and/or the processing module 901 and/or the processing circuit 904 and/or the identifying module 906, are operative, or configured, to identify, for each received test message, said type identifier of the received test message.

Further, in some embodiments, said second node and/or the processing module 901 and/or the processing circuit 904 and/or the storing module 907, are operative, or configured, to store, in response to the identification, said information regarding the received test messages based on one or more of said parameters.

Also, in some embodiments, said second node and/or the processing module 901 and/or the processing circuit 904 and/or the I/O module 905 and/or the transmitting module 909, are operative, or configured, to transmit, in accordance with said set of rules and if the set of rules supports further propagation of received test messages, each received test message further towards the test target node, e.g. the node 105.

Furthermore, in some embodiments, said second node and/or the processing module 901 and/or the processing circuit 904 and/or the recreating module 910, are operative, or configured, to recreate, if the set of rules supports further propagation of received test messages, the received test messages, so that said test messages transmitted further towards the test target node, e.g. the node 105, become said recreated test messages with at least the same type identifier and parameters as the received test messages, but comprising a source address that is an address in the network of said second node.

Figure 10:
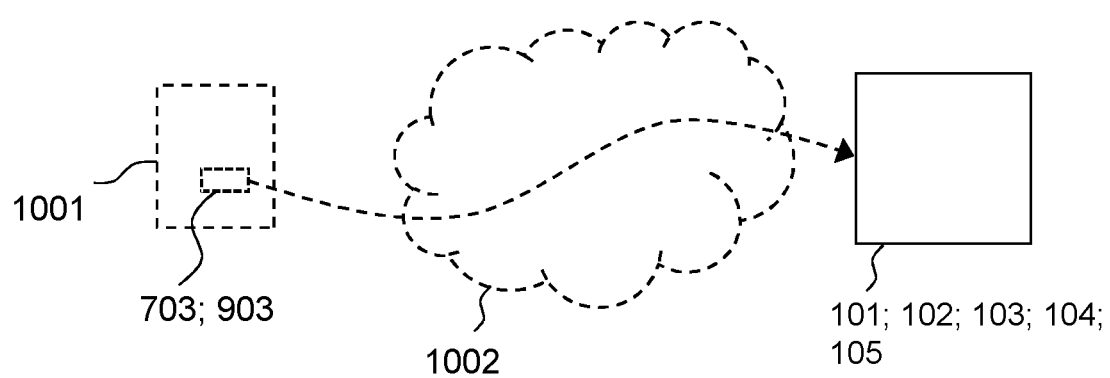
FIG. 10 is a schematic drawing illustrating embodiments relating to computer program(s) and carriers thereof to cause said one or more nodes to perform method actions.

FIG. 10 is a schematic drawing illustrating some embodiments relating to computer program(s) and carriers thereof to cause said one or more nodes discussed above in relation to FIGS. 6-9, to perform the method actions. The computer program may be the computer program(s) 703 and/or 903 and comprises instructions that when executed by the processing circuit(s) 704, 904 and/or the processing module(s) 701, 901 causes said first node and/or second node to perform as described above. It should be noted that the same computer program may configure a node so it can perform both as the first node and the second nose, i.e. a node can be configured to be able to act as any one of TO node, intermediate node and TT node. It may be up to configuration and/or circumstances that decides which role and function a certain node will have in a test.

In some embodiments there is provided a carrier, or more specifically a data carrier, e.g. a computer program product, comprising the computer program(s) 703 and/or 903. The carrier may be one of an electronic signal, an optical signal, a radio signal, and a computer readable storage medium, e.g. a computer readable storage medium 1001 as schematically illustrated in the figure. The computer program(s) 703 and/or 903 may thus be stored on the computer readable medium 1001. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 1001 may be used for storing data accessible over a computer network 1002, e.g. the Internet or a Local Area Network (LAN). The computer program(s) 703 and/or 903 may furthermore be provided as pure computer program(s) or comprised in a file or files. The file or files may be stored on the computer readable storage medium 1001 and e.g. available through download e.g. over the computer network 1002 as indicated in the figure, e.g. via a server. The server may e.g. be a web or File Transfer Protocol (FTP) server. The file or files may e.g. be executable files for direct or indirect download to and execution on said first node and/or second node to make it/them to perform as described above, e.g. by execution by the processing circuit(s) 704 and/or 904. The file or files may also or alternatively be for intermediate download and compilation involving the same or another processor to make them executable before further download and execution causing said one or more nodes to perform as described above.

Embodiments herein, as discussed above and various aspects thereof, have several advantages, as should be realized, some of which already have been discussed. To sum up, advantages include e.g. the following:

It is enabled to calculate a success rate of messages received, e.g. since it can be found out many messages are sent from a source node are received by a destination node. Additionally, we can calculate success rates per hop, for messages that are sent and received by a given pair of nodes.

Since it is a known sequence of test messages and all the received messages may be logged also along the way, it becomes possible to determine exactly where a message is lost, if any. Additionally, it becomes possible to determine the path of each one of the test messages.

It is enabled to create a topology model of the network, since it can be determined which nodes hear each other.

In a routing network, it is possible to compare routes found and the actual path(s) the messages are using. Based on results from tests based on embodiments herein, it becomes possible to manually define a route and then run the test to explore the performance of that route to thereafter based on the test result possibly update the route.

Embodiments herein are preferably basis for a standard, thus making it possible to assess network performance of in principle any Bluetooth mesh network.

Embodiments herein are compatible and applicable both for flooding and routing mesh networks.

Note that any processing module(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the first node and/or second node to be configured to and/or to perform the above-described method.

Identification by any identifier herein may be implicit or explicit. The identification may be unique in a certain context, e.g. in network, for a test, for a sequence, or at least in some relevant part or area.

The term "network node" or simply "node" as used herein may as such refer to any type of node that may communicate with another node in and be comprised in a communication network, e.g. the network 100 or the further network 110.

While some terms are used frequently herein for convenience, or in the context of examples involving other a certain, e.g. Bluetooth or other standard related, nomenclature, it must be appreciated that such term as such is non-limiting Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, random access memory (RAM) or the like. Furthermore, the memory may be an internal register memory of a processor.

Also note that any enumerating terminology such as first node, second node, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method for supporting obtaining of information regarding a Bluetooth mesh network operating according to a set of rules for propagating messages in the network, the method comprising:
   determining a node of said network to be a test originator node and at least one other node of said network to be a test target node;
   transmitting, from said test originator node in accordance with said set of rules, a sequence of test messages towards said test target node, wherein each of said test messages includes:
   parameters comprising a test message identifier being an identifier that is a sequence number of the test message in the sequence of test messages, and
   a type identifier identifying the test message as a type associated with said parameters;
   receiving, by the test target node, at least some of said transmitted test messages of the sequence after having propagated in the network according to said set of rules;
   identifying, by the test target node for each received test message, said type identifier of the received test message;
   storing, by said test target node in response to the identification, information regarding the received test messages based on one or more of said parameters; and
   obtaining the stored information from at least one of said test target node or one or more intermediate nodes.

2. The method as claimed in claim 1, wherein said parameters further comprise one or more of the following: a test originator address that is an address of the test originator node in said network and a test target address that is an address of the test target node in said network.

3. The method as claimed in claim 1, wherein each of said test messages being transmitted towards the test target node is further associated with an indication that the test message is to be excluded from further propagation by a receiving node.

4. The method as claimed in claim 1, wherein the method further comprises:
   receiving, by one or more intermediate nodes, at least some of said transmitted test messages of the sequence after having propagated in the network according to said set of rules,
   identifying, by said one or more intermediate nodes for each received test message, said type identifier of the received test message, and
   storing, by each of said one or more intermediate nodes in response to the identification, information regarding the received test messages based on one or more of said parameters.

5. The method as claimed in claim 4, wherein the method further comprises the following action performed by said one or more intermediate nodes for which said set of rules support further propagation of received test messages:
   recreating, prior to transmission, the received test messages such that the test messages that are transmitted further towards the test target node are recreated test messages, wherein the recreated test messages comprise:
   at least the same type identifier and parameters as the received test messages, and but comprising source addresses that are addresses in the network of said one or more intermediate nodes, and transmitting, in accordance with said set of rules, each received test message further towards the test target node.

6. The method as claimed in claim 1, wherein the method further comprises:

computing, based on the obtained stored information from at least one of the test target node or said one or more intermediate nodes, success rates for at least one of the test target node or one or more intermediate nodes, respectively, each success rate indicates a number of the test messages of the sequence, transmitted by the test originator node, were received by respective node associated with the success rate, and identifying, based on the obtained stored information, at least one of nodes of the network associated with propagation of messages in the network or nodes of the network redundant for propagation of messages in the network, or nodes of the network associated with a propagation problem of messages in the network.

7. The method as claimed in claim 6, wherein the method further comprises:

identifying, based on test message identifiers comprised in the obtained stored information, propagation paths taken by the test messages through nodes of the network, thereby revealing information about at least one of a topology of the network or routes in the network according to said set of rules.

8. The method as claimed in claim 1, wherein said parameters further comprise at least one of transmission power of said test originator node for transmitting the message or cumulative number of hops.

9. A first node for supporting obtaining of information regarding a Bluetooth mesh network operating according to a set of rules for propagating messages in the network, said first node is configured to be able to operate comprised in said network and be operative as a test originator node, wherein the first node is further configured to:

receive, by the test target node, at least some of said transmitted test messages of the sequence after having propagated in the network according to said set of rules;

identify, by the test target node for each received test message, said type identifier of the received test message;

store, by said test target node in response to the identification, information regarding the received test messages based on one or more of said parameters; and obtain the stored information from at least one of said test target node or one or more intermediate nodes; and transmit in accordance with said set of rules, a sequence of test messages towards a test target node comprised in said network, wherein each of said test messages includes:

parameters comprising a test message identifier being an identifier that is a sequence number of the test message in the sequence of test messages, and a type identifier identifying the test message as a type associated with said parameters.

10. The first node as claimed in claim 9, wherein said parameters further comprise one or more of the following: a test originator address that is an address of the test originator node in said network and a test target address that is an address of the test target node in said network.

11. The first node as claimed in claim 9, wherein each of said test messages being transmitted towards the test target node is further associated with an indication that the test message is to be excluded from further propagation by a receiving node.

12. A method, performed by a second node, for supporting obtaining of information regarding a Bluetooth mesh network operating according to a set of rules for propagating messages in the network, said second node is comprised in said network, the method comprising:

receiving at least some test messages of a sequence of test messages that are have been transmitted, by a test originator node, towards a test target node and propagated in the network according to said set of rules, said test originator node and said test target node are comprised in said network, wherein each of said test messages includes:

parameters comprising a test message identifier being an identifier that is a sequence number of the test message in the sequence of test messages, and a type identifier identifying the test message as a type associated with said parameters;

receiving, by the test target node, at least some of said transmitted test messages of the sequence after having propagated in the network according to said set of rules;

identifying, by the test target node for each received test message, said type identifier of the received test message;

storing, by said test target node in response to the identification, information regarding the received test messages based on one or more of said parameters; and obtaining the stored information from at least one of said test target node or one or more intermediate nodes.

13. The method as claimed in claim 12, wherein the method further comprises: transmitting, in accordance with said set of rules and if the set of rules supports further propagation of received test messages, each received test message further towards the test target node.

14. The method as claimed in claim 13, wherein the method further comprises:

recreating, if the set of rules supports further propagation of received test messages, the received test messages such that said test messages that are transmitted further towards the test target node become are recreated test messages, wherein the recreated test messages comprise:

at least the same type identifier and parameters as the received test messages, and respectively, but comprising a source address that is an address in the network of said second node.

15. A second node for supporting obtaining of information regarding a Bluetooth mesh network operating according to a set of rules for propagating messages in the network, said second node is configured to be able to operate comprised in said network, wherein the second node is further configured to:

receive at least some test messages of a sequence of test messages that are have been transmitted, by a test originator node, towards a test target node, and propagated in the network according to said set of rules, said test originator node and said test target node are comprised in said network, wherein each of said test messages includes:

parameters comprising a test message identifier being an identifier that is a sequence number of the test message in the sequence of test messages, and a type identifier identifying the test message as a type associated with said parameters;

receive, by the test target node, at least some of said transmitted test messages of the sequence after having propagated in the network according to said set of rules;

identify, by the test target node for each received test message, said type identifier of the received test message;

store, by said test target node in response to the identification, information regarding the received test messages based on one or more of said parameters; and obtain the stored information from at least one of said test target node or one or more intermediate nodes.

16. The second node as claimed in claim 15, wherein said parameters further comprise one or more of the following: a test originator address that is an address of the test originator node in said network and a test target address that is an address of the test target node in said network.

17. The second node as claimed in claim 15, wherein each of said test messages transmitted towards the test target node is further associated with an indication that the test message is to be excluded from further propagation by a receiving node.

18. The second node as claimed in claim 15, wherein the node is further configured to:

identify, for each received test message, said type identifier of the received test message, and store, in response to the identification, information regarding the received test messages based on one or more of said parameters.

19. The second node as claimed in claim 18, wherein the node is further configured to:

transmit, in accordance with said set of rules and if the set of rules supports further propagation of received test messages, each received test message further towards the test target node.

20. The second node as claimed in claim 19, wherein the node is further configured to:

recreate, if the set of rules supports further propagation of received test messages, the received test messages such that said test messages transmitted further towards the test target node are become recreated test messages, wherein the recreated test messages comprise:

at least the same type identifier and parameters as the received test messages, and respectively, but comprising a source address that is an address in the network of said second node.

\* \* \* \* \*